United States Patent
Yan

(10) Patent No.: US 7,359,885 B2
(45) Date of Patent: Apr. 15, 2008

(54) SYSTEM AND METHOD FOR DEVICE-BASED ACCESS PRIVILEGE TO AN ACCOUNT

(75) Inventor: Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/645,177

(22) Filed: Aug. 21, 2003

(65) Prior Publication Data

US 2005/0044410 A1    Feb. 24, 2005

(51) Int. Cl.
  *H04K 1/00* (2006.01)
  *H04L 9/00* (2006.01)
  *G06F 15/16* (2006.01)
  *G06F 3/00* (2006.01)

(52) U.S. Cl. .................... 705/64; 709/229; 709/230; 710/9; 710/11

(58) Field of Classification Search .................. 705/64, 705/68, 70; 709/229, 230; 710/9, 11
See application file for complete search history.

(56) References Cited

U.S. PATENT DOCUMENTS 5,903,881 A * 5/1999 Schrader et al. .............. 705/42
2002/0091635 A1   7/2002 Dilip et al. .................... 705/39
2003/0028790 A1 * 2/2003 Bleumer et al. ............ 713/189
2003/0177389 A1 * 9/2003 Albert et al. ................ 713/201
2003/0233317 A1 * 12/2003 Judd ............................ 705/39
2004/0215560 A1 * 10/2004 Amalraj et al. ............... 705/40
2005/0044197 A1 * 2/2005 Lai .............................. 709/223

OTHER PUBLICATIONS

"SkandiaBanken Selects Infinite WAP Server for Banking," *Telephone IP News*, v11, n10, Oct. 2000 (3 pages).

* cited by examiner

Primary Examiner—Andrew J. Fischer
Assistant Examiner—Charlie C. L. Agwumezie
(74) Attorney, Agent, or Firm—VanLeeuwen & VanLeeuwen; Herman Rodriguez

(57) ABSTRACT

A system and method for device-based access to account functions is provided. Access to functions is based upon the protocols supported by the device. More secure protocols are used to access all account functions including more sensitive account functions, such as making online payments and transferring funds. Less secure protocols, such as those used by mobile telephones and wireless communication devices, can still be used to access the account in order to perform less sensitive account functions, such as checking account summaries or balances. In one embodiment, the user can alter security settings to determine which account functions are allowed based on the type of protocol being used.

7 Claims, 9 Drawing Sheets

Security Settings

Banking Account Functions — 610

| HTTPS | | HTTP | | WAP | | |
|---|---|---|---|---|---|---|
| Reg. | Unreg. | Reg. | Unreg. | Reg. | Unreg. | |
| ☑ | ☑ | ☐ | ☐ | ☐ | ☐ | Change Security Settings |
| ☑ | ☑ | ☑ | ☑ | ☑ | ☑ | Check Account Balances (Overview) |
| ☑ | ☑ | ☑ | ☑ | ☑ | ☐ | Transfer Between Accounts |
| ☑ | ☑ | ☑ | ☐ | ☑ | ☐ | Online Banking (Pay Bills) |
| ☑ | ☑ | ☑ | ☐ | ☐ | ☐ | Change Password/Login ID |
| ☑ | ☑ | ☑ | ☑ | ☑ | ☑ | View Statement |
| ☑ | ☑ | ☑ | ☐ | ☐ | ☐ | Request New Account |

Brokerage Account Functions — 620

| HTTPS | | HTTP | | WAP | | |
|---|---|---|---|---|---|---|
| Reg. | Unreg. | Reg. | Unreg. | Reg. | Unreg. | |
| ☑ | ☑ | ☑ | ☐ | ☐ | ☐ | Brokerage Services |
| ☑ | ☑ | ☑ | ☐ | ☐ | ☐ | Trade Securities (Buy/Sell) |
| ☑ | ☑ | ☑ | ☑ | ☑ | ☐ | Account Overview |
| ☑ | ☐ | ☑ | ☐ | ☐ | ☐ | Account History |

Registered Addresses — 630

- 192.168.1.201
- 192.168.1.202
- 192.168.1.203

640

Add New Address — 650

Remove Address — 660

Save & Exit — 680        690 → Cancel

SYSTEM AND METHOD FOR DEVICE-BASED ACCESS PRIVILEGE TO AN ACCOUNT

BACKGROUND OF THE INVENTION

1. Technical Field

The present invention relates in general to a system and method for providing device-based access to an account. More particularly, the present invention relates to a system and method for providing access to online financial transactions based upon the protocol supported by the user's device.

2. Description of the Related Art

Modern computing devices range from large super computers to small handheld devices, such as personal digital assistants (PDAs) and mobile telephones. Users are increasingly using a variety of computing devices to request and retrieve information from servers by using computer networks, such as the Internet.

Devices support different protocols based upon the devices capabilities. A protocol is an agreed-upon format for transmitting data between two devices. The protocol determines the type of error checking that is used, the type of data compression (if any) that is used, how the sending device indicates that it is finished sending a message, and how the receiving device acknowledges receipt of a message. Each protocol has particular advantages and disadvantages. For example, some are easier to use than others, some are more secure than others, some are faster than others, and some are more reliable than others.

One computing device may support a particular protocol and not support another protocol. Users connecting to a website of a financial institution may wish to connect using a variety of devices that support a variety of protocols. One of these protocols is the Wireless Access Protocol (WAP), which is a secure specification that allows users to access information using wireless, usually handheld devices such as mobile phones, pagers, two-way radios, smartphones, communicators, and PDAs. Another protocol is the HyperText Transfer Protocol (HTTP) which is an underlying protocol used by the World Wide Web (WWW). HTTP defines how messages are formatted and transmitted and what actions Web servers and browsers should perform in response to various commands. An extension of the HTTP protocol, called "S-HTTP" uses encryption to provide secure messages between a computing devices, such as a client and a server. A challenge, however, is that not all browsers and computing devices support the secure version of HTTP. Another technology used for securely transmitting messages is Secure Socket Layer (SSL) which establishes a secure connection using encryption between two computers. While both use encryption to secure messages, SSL and S-HTTP have different designs and goals. By convention, the address or "Uniform Resource Locator" (URL) of a Web page that require an SSL connection start with "https" rather than "http."

A challenge of providing financial information is that much of the information is confidential, or sensitive, so secure connections (i.e., SSL) are often required in order for a user to view his or her account stored on the financial institution's server. This requirement, however, conflicts with the desire of many users to view financial information using portable devices, such as PDAs and mobile phones, that have browsers that do not support the type of secure connections provided using SSL. In addition, financial information has degrees of sensitivity depending on what the user wants to do with the information. For example, simply checking an account overview (i.e., account balances), may not be seen by the user as being as sensitive as transferring money to other accounts or using online bill paying services where an account balance is actually changed.

What is needed, therefore, is a system and method for allowing the user to access his or her financial information from a variety of devices. What is further needed is a system and method that permits access to financial functions based on the sensitivity of the functions. Finally, what is needed is a system and method that allows a user to choose which functions can be performed when the user is connected to the financial institution's servers using a variety of protocols corresponding to a variety of communication devices and the additional ability of optionally "registering" network addresses of the user's devices.

SUMMARY

It has been discovered that the aforementioned challenges are resolved using a system and method that provides device-based access to account functions based upon one or more protocols supported by the device. For example, if the user is using a device that communicates with a more secure protocol, such as secure HyperText Transfer Protocol (HTTPS), then more sensitive account functions, such as making online payments and transferring funds may be allowed. However, if the user's device is using a less secure protocol, such as Wireless Access Protocol (WAP) or HyperText Transfer Protocol (HTTP), then less sensitive account functions might be provided, such as checking account summaries or balances, while not allowing access to more sensitive account functions, such as making online payments and transferring funds. In this manner, the user is not entirely restricted from accessing his or her account simply because of the protocol supported by the user's device.

In one embodiment, the user establishes security settings that determine whether the user is allowed to perform a particular account function based on the type of protocol being used. The user can choose between the convenience of accessing account functions and possible security risks involved with using less secure protocols. In addition, the user can alter the security settings temporarily and then reset the security settings to their previous values. For example, suppose a user typically accesses his account from a desktop computer using a browser that supports the HTTPS protocol, however the user is going on vacation for a week and does not wish to bring a portable computer on the trip. The user can temporarily alter his security settings and allow account functions, such as bill payment functions and funds transfer functions, to be performed when using devices that use the WAP protocol, such as a mobile telephone or wireless Personal Digital Assistant (PDA). In this manner, the user can still access these functions while on vacation. Following the vacation, the user is able to reset the security settings to only allow the funds transfer and online payment functions from devices that support the HTTPS protocol.

A further embodiment provides for the registration of network addresses, such as IP addresses, corresponding to the user's devices. Devices using a registered IP address can be treated differently because the connection is less prone to hackers or other unauthorized people accessing the account.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 6 is a screen layout showing security settings that can be selected by a user;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
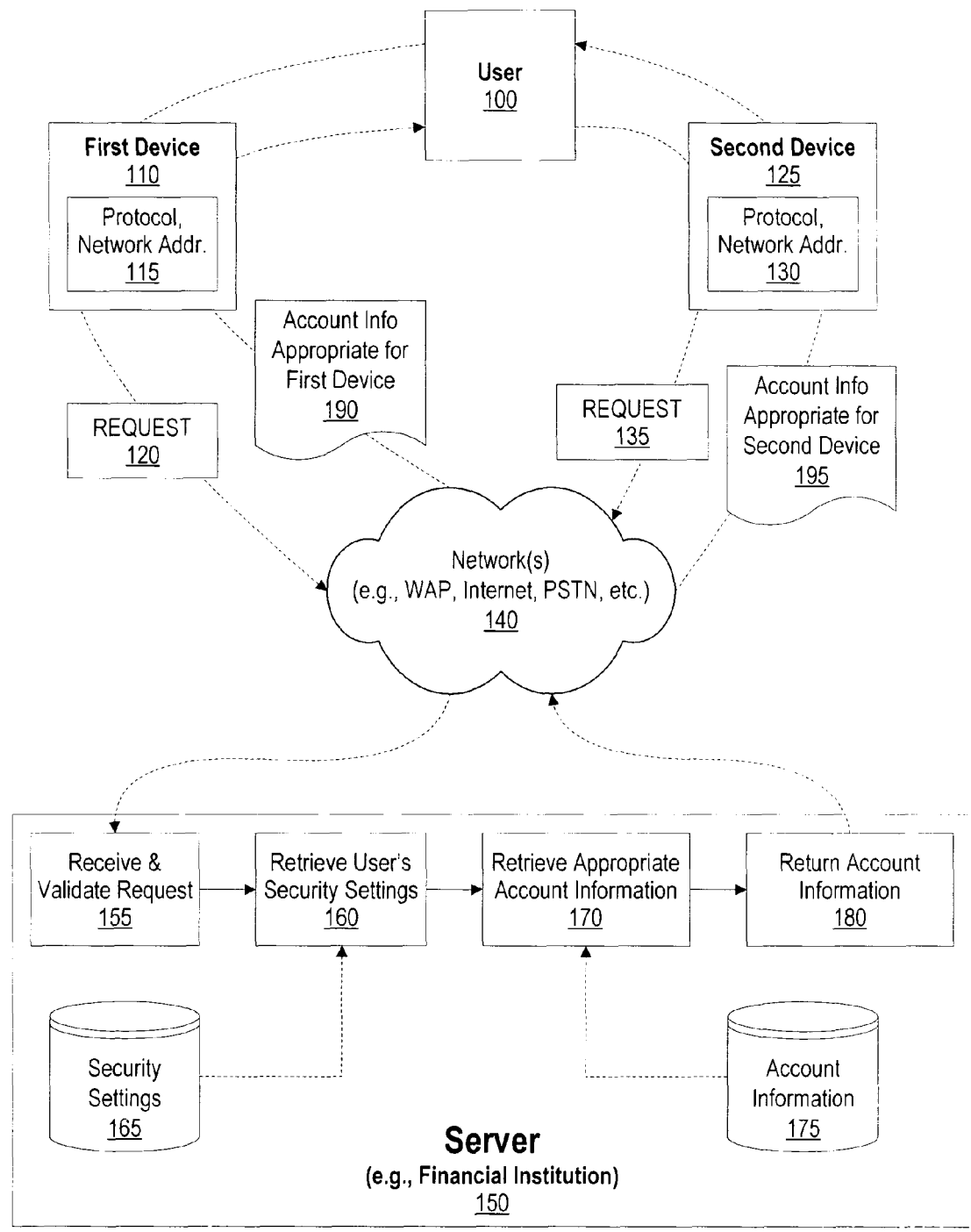
FIG. 1 is a network diagram showing a user accessing a financial institution's server using two different devices and protocols.

FIG. 1 is a network diagram showing a user accessing a financial institution's server using two different devices and protocols. User 100 connects to financial institution server 150 using one or more devices, such as first device 110 and second device 125. Each of these devices uses a protocol and has a network address (115 and 130, respectively) for communicating with others over the network. Examples of protocols include Wireless Access Protocol (WAP), HyperText Transfer Protocol (HTTP), and secure HyperText Transfer Protocol (HTTPS). The type of protocol used by a device depends on the capabilities of the device as well as network(s) 140 used. For example, a mobile wireless device, such as a Personal Digital Assistant (PDA) or mobile telephone, typically uses the Wireless Access Protocol to communicate with other computing devices, while a desktop computer system typically uses the HyperText Transfer Protocol to access other computer systems and may use a secure version of HTTP if the browser on the desktop computer system supports Secure Socket Layer (SSL) or other encryption scheme.

In FIG. 1, user 100 sends request 120 using first device 110 with first protocol and network address 115 to access financial institution server 150 through network(s) 140. Financial institution server 150 receives and validates the user's request at step 155. The server retrieves the user's security settings at step 160 from data store 165. These security settings may be settings that the user established or default security settings established by the financial institution. In addition, security settings can be based on the protocol that is being used as well as whether the device's network address has been pre-registered at the financial institution and stored in security settings 165.

At step 170, the user's account information is retrieved from data store 175 based upon the retrieved security settings. For example, if the settings indicate that the user is not allowed to transfer funds or pay bills when the user's device is communicating with the financial institution using the WAP protocol, then account functions allowing the user to transfer funds and pay bills would not be enabled by the financial institution's server. Account information appropriate for the protocol being used by the user's device is returned to the user by the financial institution's server at step 180. The user's device, in turn, receives account information 190 appropriate for the first device.

Similarly, when user 100 is using second device 125 to access the financial institution's server using a second protocol and network address 130, the server receives and validates the request (step 155) and retrieves the user's security settings (step 160) from data store 165. However, because the user is using a different protocol to access the server, different security settings may be retrieved resulting in different account information being retrieved (step 170) from data store 175 and returned to the user at 180. For example, if the second device is a desktop computer system with a browser that supports SSL, the security settings might allow the user to transfer funds and pay bills online. Therefore, the account information returned to the user would include account functions that were not permitted when the user was using first device 110.

Figure 2:
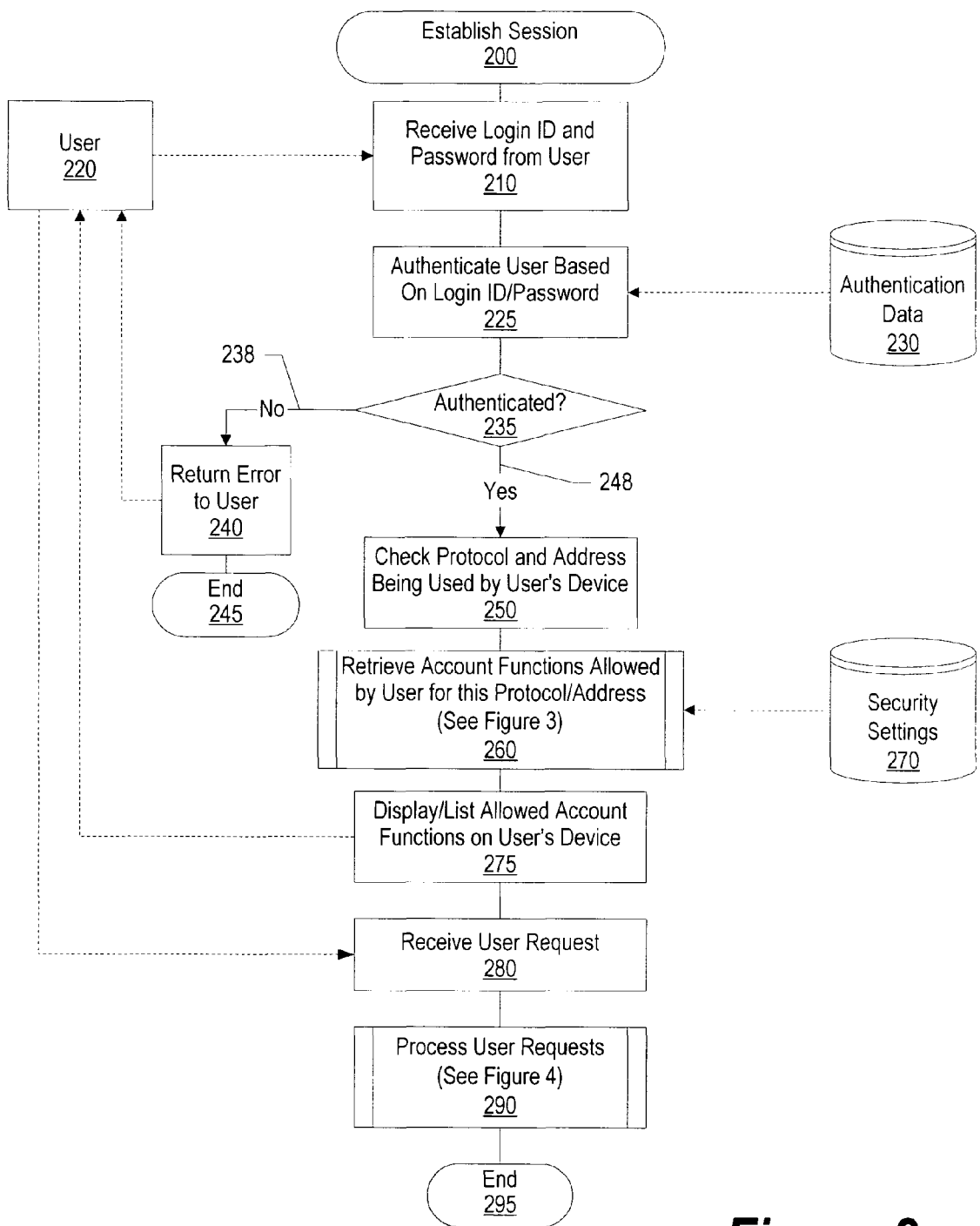
FIG. 2 is a flowchart showing the steps taken to establish a session between a user's device and the financial institution's server.

FIG. 2 is a flowchart showing the steps taken to establish a session between a user's device and the financial institution's server. Processing commences at 200 whereupon the financial institution's server receives the user's login identifier (i.e., user id) and password at step 210 from user 220. At step 225, the financial institution's server authenticates the user by checking the login identifier and password with authentication data 230 that was previously stored on a nonvolatile storage device accessible from the financial institution's computer system.

A determination is made as to whether the user information is authenticated (decision 235). If the information is not authenticated (i.e., the login identifier, password, or combination thereof was not found in authentication data 230), decision 235 branches to "no" branch 238 whereupon an error is returned to the user at step 240 and processing ends at 245.

On the other hand, if the user's login identifier and password were authenticated, decision 235 branches to "yes" branch 248 whereupon the protocol and network address (e.g., IP address) being used by the user's device is retrieved (step 250). The account functions that are allowed based upon the protocol being used and whether the network address has been registered are retrieved from security settings data store 270 (predefined process 260, see FIG. 3 and corresponding text for processing details).

The allowed account functions are listed or displayed on the user's device at step 275. If the user is using a device with a display screen, the allowed activities are displayed on the device's display screen and the user selects an account function by selecting a displayed action (i.e., by using a pointing device or keyboard to select). If the user is using a device, such as a telephone, with little or no display capabilities, the list of account functions is audibly played to the user and the user makes a selection by pressing a key on the telephone keypad. At step 280, the financial institution's server receives the user's request and the request is processed (predefined process 290, see FIG. 4 and corresponding text for processing details). Processing thereafter ends at 295.

Figure 3:
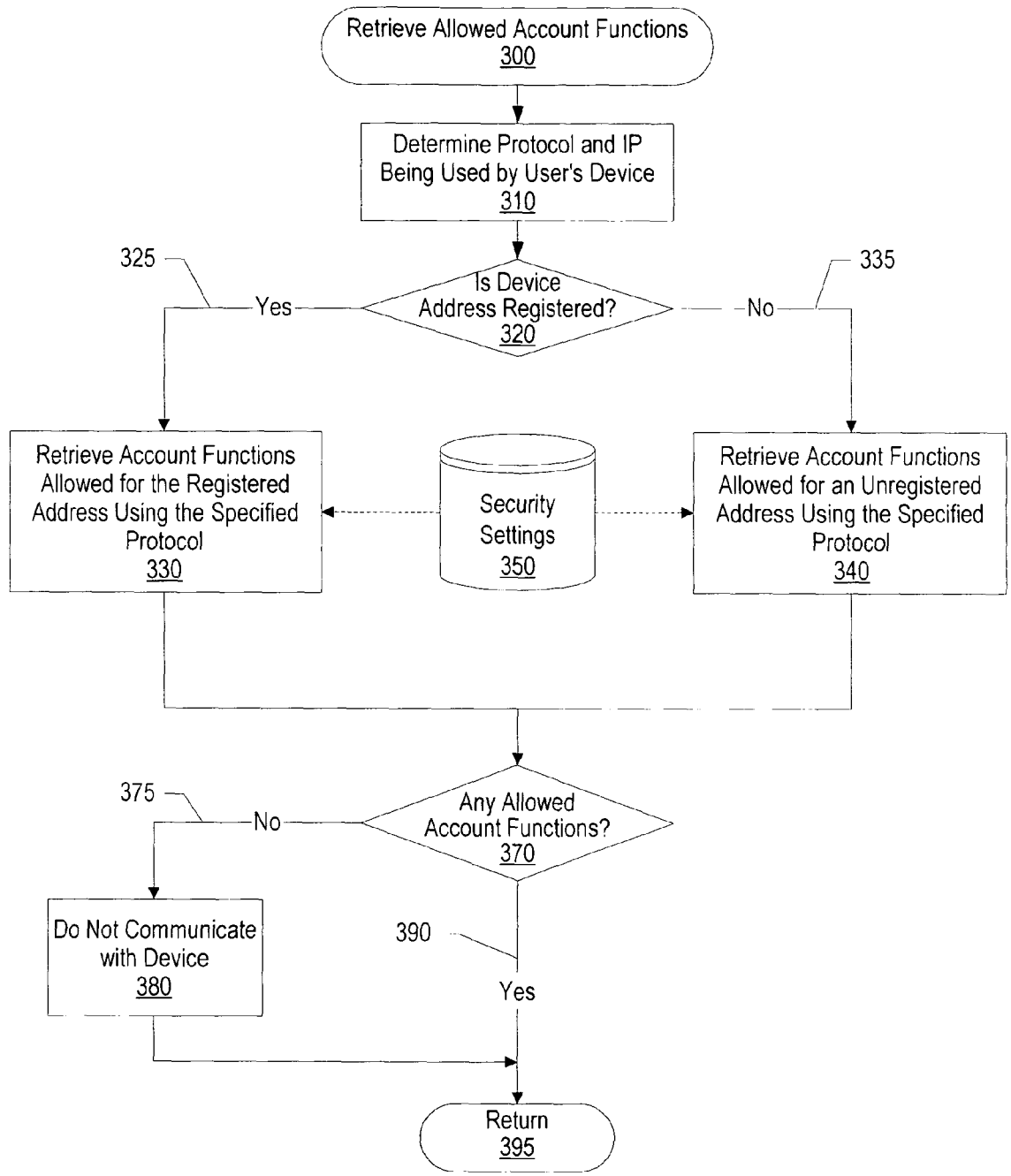
FIG. 3 is a flowchart showing the steps taken to retrieve the allowed actions corresponding to the protocol being used by the user's device and whether the network address of the device has been pre-registered by the user.

FIG. 3 is a flowchart showing the steps taken to retrieve the allowed account functions corresponding to the protocol being used by the user's device. Processing commences at 300 whereupon, at step 310, the financial institution's computer system determines the protocol being used by the user's computing device to access the financial institution's computer as well as the network address being used by the user's computing device (e.g., the IP address). A determination is made as to whether the network address being used by the user's device has been registered at the financial institution (decision 320). If the network address has been registered, decision 320 branches to "yes" branch 325 whereupon, at step 330, the account functions allowed for a registered address using the given protocol (e.g., HTTPS, HTTP, WAP, etc.) are retrieved from security settings data store 350.

On the other hand, if the network address being used by the user's device has not been registered, then decision 320 branches to "no" branch 335 whereupon, at step 340, the account functions allowed for an unregistered address using the given protocol are retrieved from security settings data store 350.

After the list of any allowed account functions has been retrieved based upon the protocol being used by the user's device and whether the network address of the user's device is registered, a determination is made as to whether there are any allowed account functions that the user can perform given the protocol and address being used (decision 370). If there are no allowed account functions for the protocol and address, decision 370 branches to "no" branch 375 whereupon, at step 380, the financial institution's server ceases communication with the device and does not allow the device to perform any actions. On the other hand, if there is at least one allowed account function corresponding to the protocol and address, decision 370 branches to "yes" branch 390 bypassing step 380. Processing then returns to the calling routine at 395.

Figure 4:
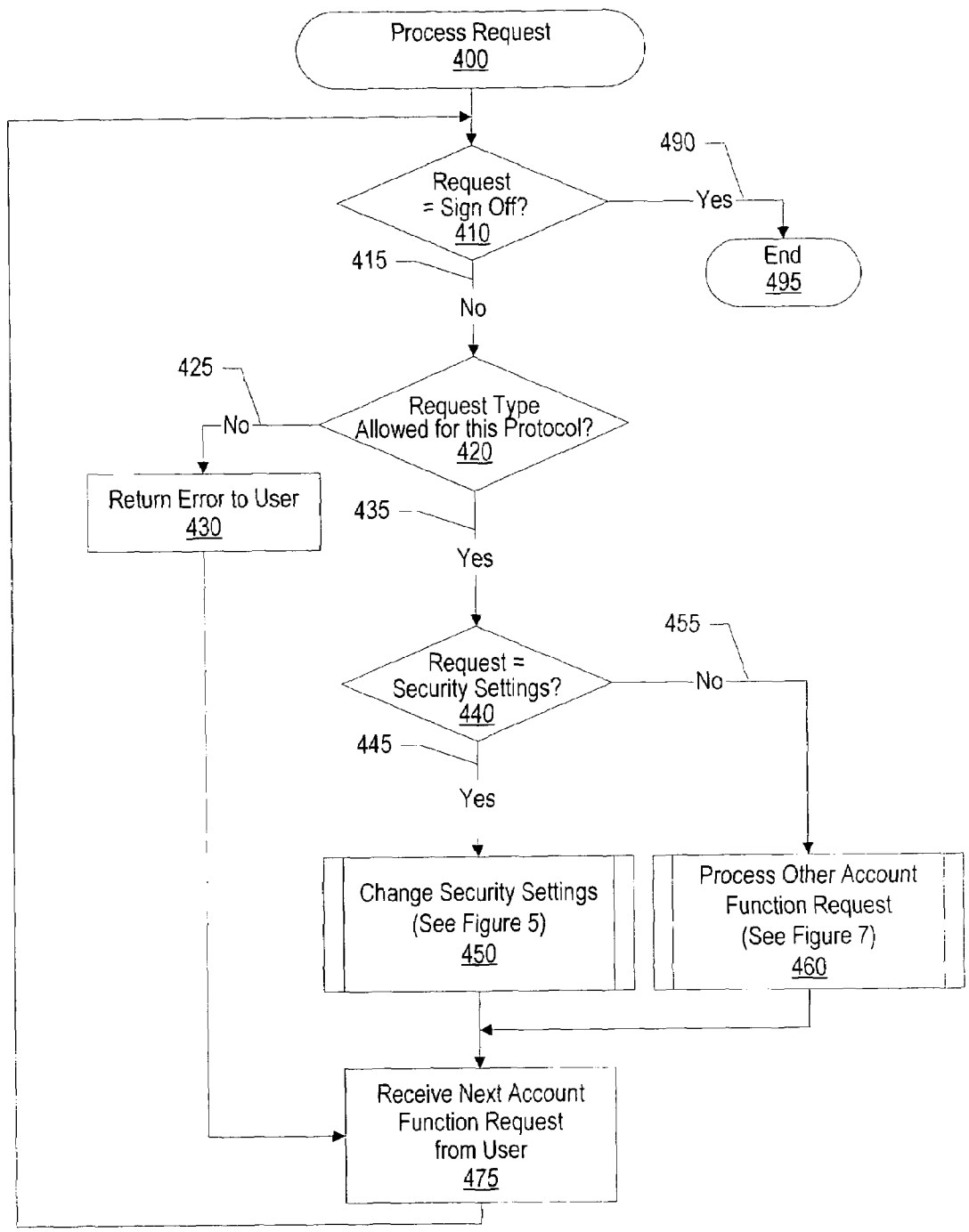
FIG. 4 is a flowchart showing the steps taken to process a user's request.

FIG. 4 is a flowchart showing the steps taken to process a user's request. Processing commences at 400 whereupon a determination is made as to whether the user is requesting to sign off of the financial institution's Web server (decision 410). If the user is not requesting to sign off, decision 410 branches to "no" branch 415 whereupon another determination is made as to whether the account function being requested is allowed given the protocol being used by the user's device (decision 420). If the account function being requested is not allowed given the protocol being used by the user's device, decision 420 branches to "no" branch 425 whereupon, at step 430, an error is returned to the user informing the user that the request is not allowed. In another embodiment, the user is only provided with a list of allowable actions from which to select. However, hackers and other malevolent users may attempt to use a non-secure protocol to request account functions that are not allowed based on the protocol. Therefore, checking whether the account function being requested is allowed given the protocol is nonetheless helpful in thwarting efforts by hackers or other malevolent users that may attempt to log onto another user's account to illegally withdraw funds or transfer money.

If the account function being requested is allowed given the protocol being used, decision 420 branches to "yes" branch 435 whereupon a determination is made as to whether the request is to change the user's security settings (decision 440). If the request is to change security settings, decision 440 branches to "yes" branch 445 whereupon a routine is performed to change the user's security settings (predefined process 450, see FIG. 5 and corresponding text for processing details). On the other hand, if the request is to perform an account function other than change security settings, decision 440 branches to "no" branch 455 whereupon the other account function is performed (predefined process 460, see FIG. 8 and corresponding text for processing details).

The next request is received from the user at step 475 and processing loops back to process the next received request. This looping continues until the user requests to sign off of the financial institution's web server, at which point decision 410 branches to "yes" branch 490 and processing ends at 495.

Figure 5:
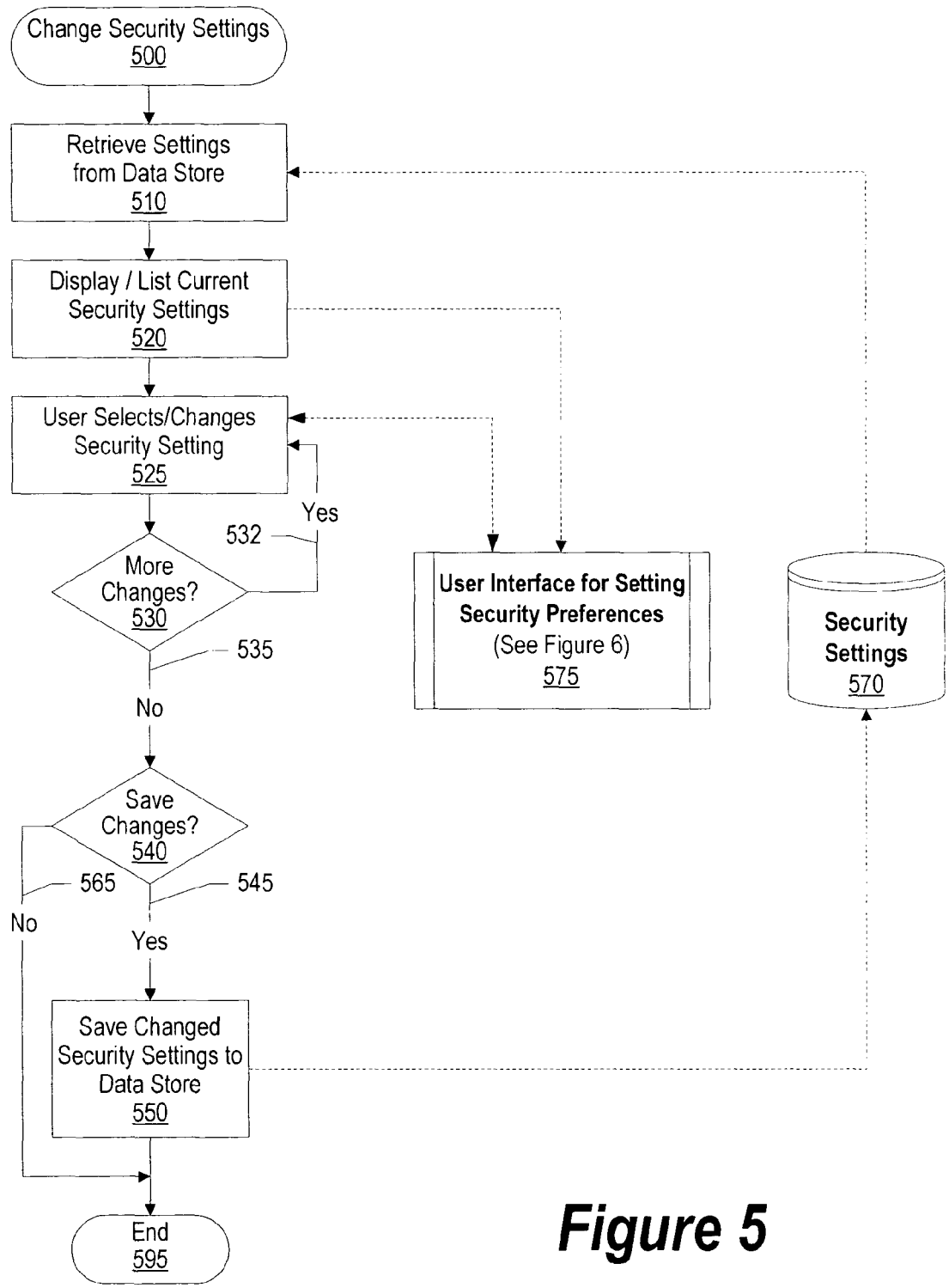
FIG. 5 is a flowchart showing steps taken to change a user's security settings.

FIG. 5 is a flowchart showing steps taken to change a user's security settings. Processing commences at 500 whereupon, at step 510, the user's current security settings are retrieved from security settings data store 570. If the user has not previously established security settings, then default security settings established by the financial institution are retrieved.

At step 520, the retrieved security settings are displayed in window (predefined process 575, see FIG. 6 and corresponding text for details of the displayed user interface window).

At step 525, the user selects and changes a security setting, enabling or disabling access to an account function when operating using a particular protocol. A determination is made as to whether the user wishes to make more changes to his or her security settings (decision 530). If more changes are desired, decision 530 branches to "yes" branch 532 which loops back to receive the next selection and change from the user. This looping continues until there are no more changes, at which point decision 530 branches to "no" branch 535.

A determination is made as to whether the user wishes to save the changes made to the security settings or cancel such changes (decision 540). The user indicates this decision by selecting either "save" or "cancel." (See "save" command button 680 and "cancel" command button 690 in FIG. 6). If the user chose to save the changes, decision 540 branches to "yes" branch 545 whereupon, at step 550, the user's security settings are saved to security settings data store 570. On the other hand, if the user chose to cancel (i.e., not save the changes), decision 540 branches to "no" branch 565 bypassing step 550. Processing of the user's security settings changes thereafter ends at 595.

FIG. 6 is a screen layout showing security settings that can be selected by a user. User interface window 600 is divided into three frames. Frame 610 includes "banking account functions" security selections that the user can select to indicate which banking account functions he or she wishes to be made available when the user is using a device with a corresponding protocol from a registered or unregistered address. Frame 620 includes "brokerage account functions" security selections that the user can select to indicate which brokerage account functions he or she wishes to be made available when the user is using a device with a corresponding protocol from a registered or unregistered address. Finally, frame 630 is used by the user to add and remove registered addresses, such as IP addresses. When an address is registered it is arguably more secure than an address using the same protocol that is not registered. For example, if a user has a static IP address that he or she uses to access the Internet from their desktop computer, then the user is more certain that a hacker or other malicious user is not attempting to access the user's account.

Frames 610 and 620 within user interface window 600 include checkboxes that the user can check or uncheck depending upon whether the user wishes to allow access to various account functions using various protocols. In the example shown, three protocols are supported by the financial institution—secure HTTP (HTTPS), HTTP, and WAP. Within each of these protocols, the user can select whether a given account function can be performed by any device using the given protocol, or can only be performed by a device with a registered address (e.g., a registered IP address). In the example shown, the user has selected that each account function be made available when the user is using HTTPS from a registered address. When the user is using HTTPS from an unregistered address, all account functions are available except the user cannot access his or her brokerage account history.

When the user is using a device communicating using the HTTP protocol from a registered address, the user is allowed to check balances, transfer money between accounts, perform online banking functions, change his or her login ID and/or password, view account statements, request new accounts, access brokerage services, trade securities, receive brokerage account overviews, and receive brokerage trading histories. On the other hand, if the user is using a device communicating using the HTTP protocol from an unregistered address, the user cannot perform online banking functions, change login IDs/passwords, request new accounts, request brokerage services, trade securities, or receive account brokerage account histories, all of which are allowed if the user's address is registered.

If the user is using a device communicating using the WAP protocol from a registered address, the user can check banking account balances, transfer money between accounts, perform online banking functions, view statements, and receive account overviews of the user's brokerage account. From an unregistered WAP address, the user can only check banking account balances and view account statements.

The user can select additional options or remove options that are currently selected for a given account function. For example, the user can check the checkbox allowing the user to "request a new account" when using a device communicating with either HTTP and/or the WAP protocols. Likewise, the user could remove the check from the checkbox to online banking services when using an unregistered address and the HTTPS protocol. In this manner, the user can temporarily grant or restrict access to certain account functions. For example, suppose the user normally performs brokerage account functions from his desktop computer using a registered address that uses the HTTPS protocol. If the user is going to be traveling, he can temporarily allow access to needed brokerage account functions from a device, such as a mobile telephone, that uses the WAP protocol so that the user can still trade securities while traveling. For added security, the user can temporarily register the WAP address of his mobile device, if a static address is available, and select the security settings accordingly. Upon return from traveling, the user can reset the security settings so that brokerage account functions are no longer allowed from a device using the WAP protocol.

Frame 630 is used to register and de-register addresses, such as IP addresses, used by the user to access account functions. List box 640 includes the addresses that are currently registered. In the example shown, three addresses are currently registered. Command button 650 is used to add a new address to the registered address list. To remove a registered address, the user selects the address and then selects remove address command button 660.

After the user is finished making security selections and registering or removing registered addresses, he or she either selects "save" command button 680 to save the changes that were made and exit, or selects "cancel" command button 690 to cancel the changes that were made and exit.

Figure 7A:
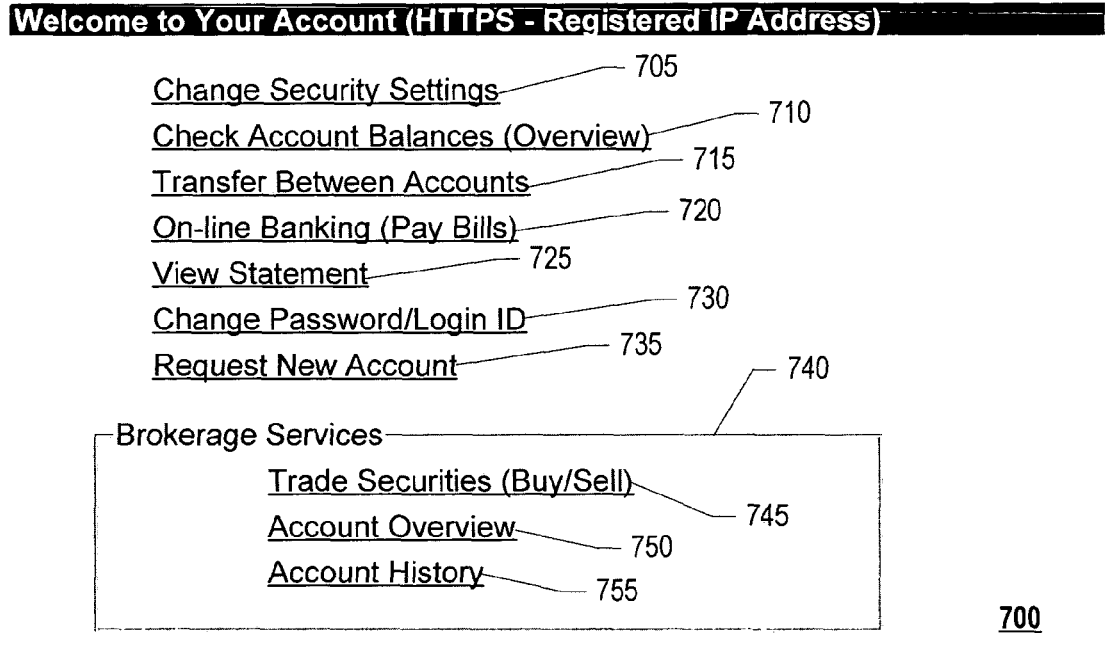
FIG. 7A is a sample screen showing the user-selected actions that are available when the user is accessing the financial institution's server using a device that communicates using a secure protocol.

FIG. 7A is a sample screen showing the user-selected actions that are available when the user is accessing the financial institution's server using a device that communicates using a secure protocol from a registered IP address. When the user accesses his or her account using a device that communicates using the secure HTTP protocol after establishing the security settings shown in FIG. 6, browser window 700 is displayed. Browser window 700 includes eight account functions, 705 through 735, as well as brokerage services frame 740 which includes three possible brokerage account functions 745 through 755.

Figure 7B:
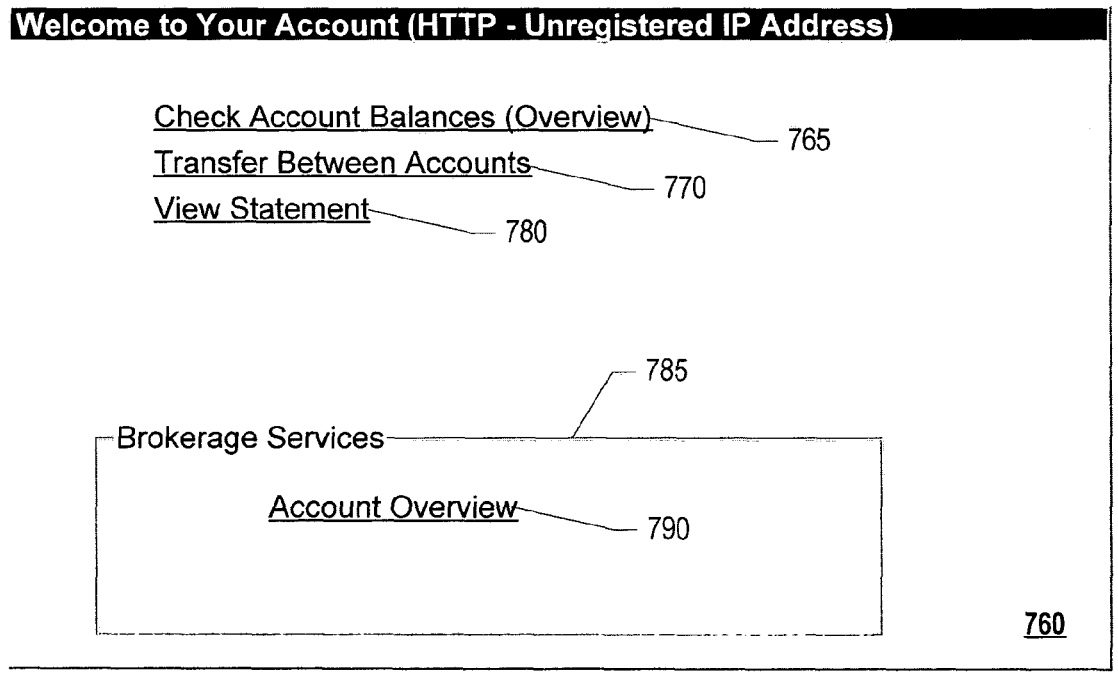
FIG. 7B is a sample screen showing the user-selected actions that are available when the user is accessing the financial institution's server using a device that communicates using a non-secure protocol.

FIG. 7B is a sample screen showing the user-selected account functions that are available when the user is accessing the financial institution's server using a device that communicates using a non-secure protocol from an unregistered IP address after establishing the security settings shown in FIG. 6. Because the protocol is not secured, fewer account functions are available from browser window 760 in FIG. 7B as there were in browser window 700 shown in FIG. 7A. Three selections, 765, 770, and 780, are available as well as brokerage account functions frame 785 which includes account function 790. The user can change the security settings, shown in FIG. 6, in order to make more or fewer selections available.

Figure 8:
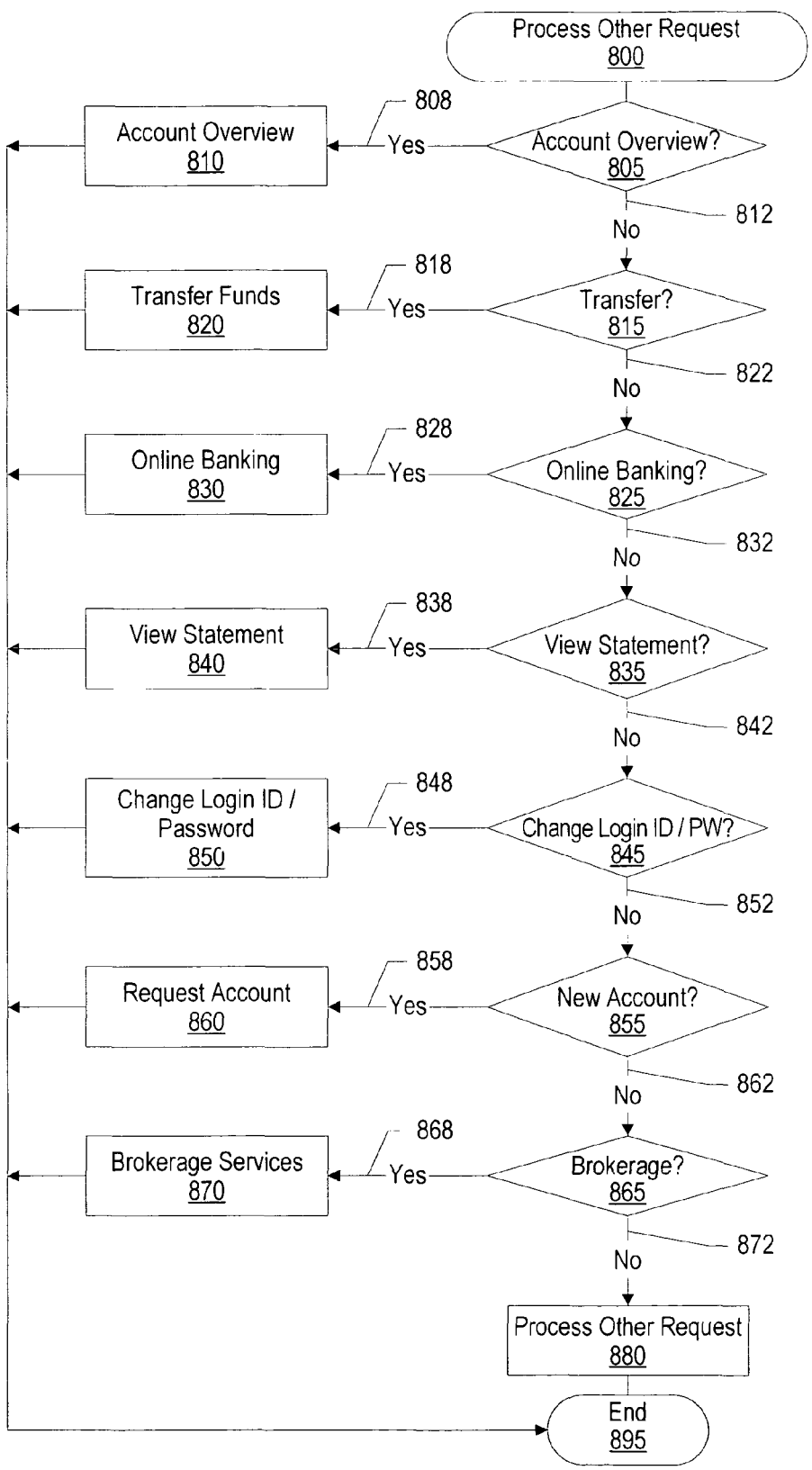
FIG. 8 is a flowchart showing the steps taken to process financial actions requested by the user.

FIG. 8 is a flowchart showing the steps taken to process account functions requested by the user. Processing commences at 800 whereupon a series of decisions are made to determine the request that was made by the user. A determination is made as to whether the user has selected an account overview (decision 805). If the user selected an account overview, decision 805 branches to "yes" branch 808 whereupon, at step 810 the account overview function is performed.

If the user did not select an account overview, decision 805 branches to "no" branch 812 whereupon a determination is made as to whether the user has selected a funds transfer (decision 815). If the user selected a funds transfer, decision 815 branches to "yes" branch 818 whereupon, at step 820 the funds transfer function is performed.

If the user did not select an funds transfer, decision 815 branches to "no" branch 822 whereupon a determination is made as to whether the user has selected online banking (decision 825). If the user selected online banking, decision 825 branches to "yes" branch 828 whereupon, at step 830 the online banking account function is performed.

If the user did not select online banking, decision 825 branches to "no" branch 832 whereupon a determination is made as to whether the user has requested to view an account statement (decision 835). If the user has requested to view an account statement, decision 835 branches to "yes" branch 838 whereupon, at step 840 the view statement account function is performed.

If the user did not request to view an account statement, decision 835 branches to "no" branch 842 whereupon a determination is made as to whether the user has requested to change his or her login identifier or password (decision 845). If the user has requested to change his or her login identifier or password, decision 845 branches to "yes" branch 848 whereupon, at step 850 the change login identifier/password account function is performed.

If the user did not request to change his or her login identifier or password, decision 845 branches to "no" branch 852 whereupon a determination is made as to whether the user has requested a new account (decision 855). If the user has requested a new account, decision 855 branches to "yes" branch 858 whereupon, at step 860 the request new account function is performed.

If the user did not request a new account, decision 855 branches to "no" branch 862 whereupon a determination is made as to whether the user has requested a brokerage account function (decision 865). If the user has requested a brokerage account function, decision 865 branches to "yes" branch 868 whereupon, at step 870 the requested brokerage account function is performed.

If the user did not request brokerage services, decision 865 branches to "no" branch 872 whereupon, at step 880, the account function requested by the user is performed. After the account function requested by the user has been performed, processing returns at 895.

Figure 9:
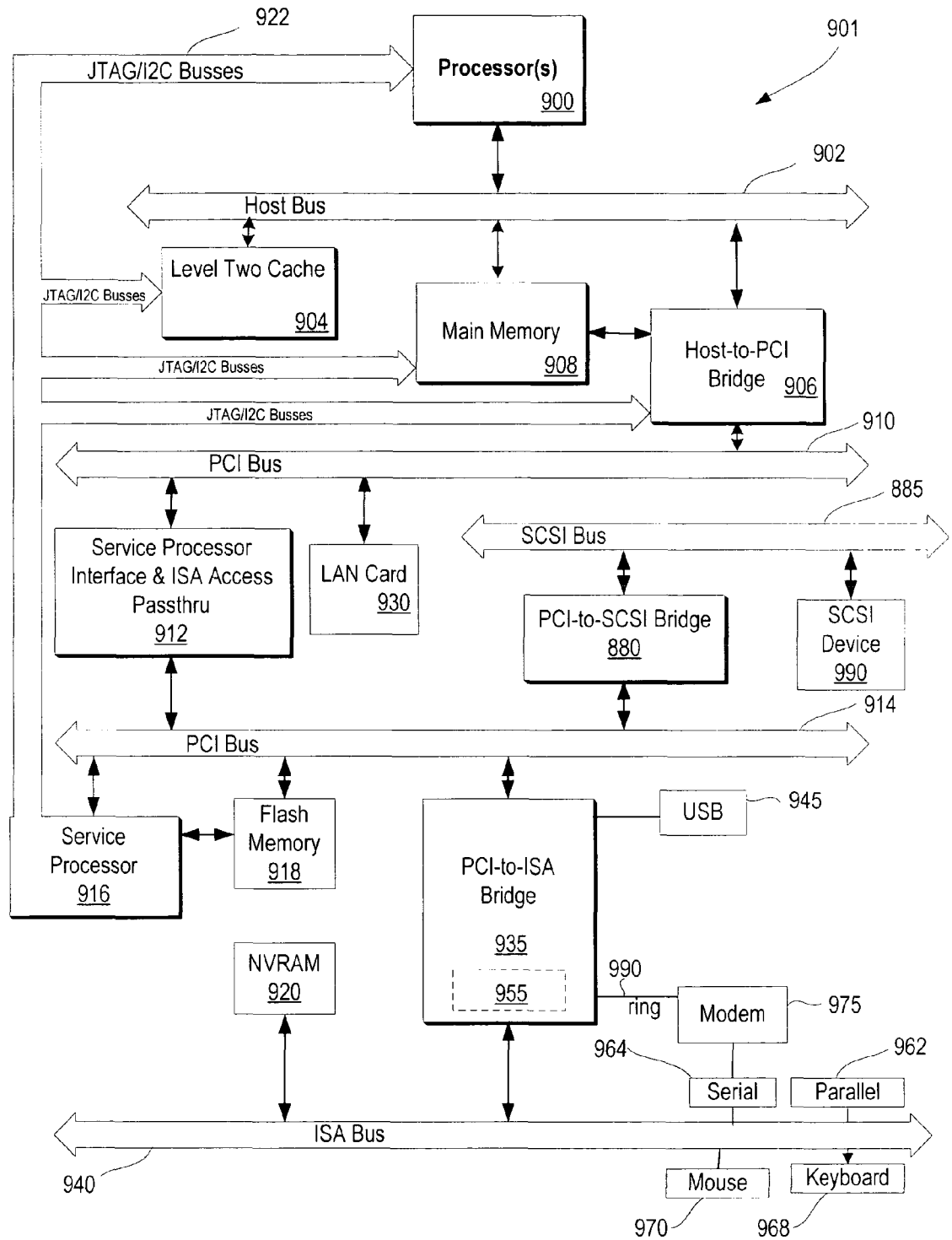
FIG. 9 is a block diagram of an information handling system capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. PCI-to-SCSI bridge 980 provides bus control to handle transfers between PCI bus 914 and SCSI bus 985. SCSI device 990 (i.e. a SCSI hard drive) communicates with other parts of computer system 901 using SCSI bus 985.

Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of accessing an online account, said method comprising:
   receiving, through a network, a request from a computing device;
   identifying a protocol, from a plurality of supported protocols, that was used by the computing device to send the request;
   retrieving a network address corresponding to the computing device;
   determining whether the network address is registered;
   in response to identifying the protocol and determining that the network address is registered, selecting one or more allowed financial account functions from a plurality of financial account functions stored in a data store, wherein the allowed financial account functions are selected based upon the network address and the identified protocol; and
   in response to identifying the protocol and determining that the network address is not registered, selecting the one or more allowed financial account functions from the plurality of financial account functions stored in the data store, wherein the allowed financial account functions are selected based upon the identified protocol.

2. The method as described in claim 1 further comprising: returning financial function names corresponding to the allowed financial account functions to the computing device, wherein the financial function names are adapted to be displayed on the computing device.

3. The method as described in claim 2 further comprising:
   receiving a second request from the computing device, the second request corresponding to one of the allowed financial account functions;
   performing the allowed financial account function corresponding to the second request; and
   returning data to the computing device in response to performing the allowed financial account function.

4. The method as described in claim 1 wherein at least one of the allowed financial account functions is selected from the group consisting of change security settings, check account balances, transfer funds, online banking, change password, view detailed account statement, request new account, trade securities, view brokerage account overview, and view brokerage account history.

5. The method as described in claim 1 further comprising:
   receiving a second request from the computing device to alter security settings;
   returning a selection page to the computing device, the selection page including indicators for the allowed financial account functions currently accessible to the computing device;
   receiving one or more security selections from the computing device in response to the user of the computing device altering the currently allowed financial account functions currently accessible to the computing device; and
   storing the received security selections in the data store.

6. The method as described in claim 1, wherein the request includes a first financial account function being requested by the user of the computing device, the method further comprising:
   performing the first financial account function in response to determining that the first financial account function is included in the allowed financial account functions; and
   sending an error message to the computing device in response to determining that the first financial account function is not included in the allowed financial account functions.

7. The method as described in claim 1 wherein the computing device is selected from the group consisting of a personal computer, a personal digital assistant, a mobile telephone, a pervasive computing device, and a network appliance.

* * * * *